United States Patent Office 3,051,735
Patented Aug. 28, 1962

3,051,735
HALOGEN SUBSTITUTED ALKENYL DITHIO-CARBAMIC ACID SALTS AND ESTERS
John J. D'Amico, Nitro, W. Va., assignor to Monsanto Chemical Company, St. Louis, Mo., a corporation of Delaware
No Drawing. Filed Sept. 18, 1958, Ser. No. 761,702
7 Claims. (Cl. 260—429.9)

The present invention relates to a new class of dithiocarbamates and derivatives thereof.

Dithiocarbamates, as are known, all contain the characteristic and common grouping

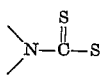

The new compounds comprising the present invention contain linked to the nitrogen one hydrogen and one halogen substituted lower alkenyl radical. The free acids are not stable at ordinary temperatures but stable derivatives have been prepared. These compounds may be represented schematically by the following general formula:

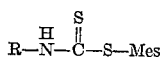

where R represents a halogen substituted lower alkenyl group and Mes represents an ester or salt forming group. Examples of R comprise 2-chloroallyl, 2-bromoallyl, 2-fluoroallyl, 2-iodoallyl, 2,3-dichloroallyl, 2-fluoro-3-choroallyl, 2,3-dibromoallyl, 2,3-diodoallyl, 3,3-dichloroallyl, 3,3-dibromoallyl, 2,3-dichloro-2-butenyl and 3-iodoallyl. The radical designated as Mes may be the same or different halogen substituted lower alkenyl group, hydrocarbon as for example, lower alkenyl, alicyclic, phenyl and di(lower alkyl)aminoethyl, or a metal. The invention will be fully understood and apparent from the detailed examples which follow.

EXAMPLE 1

To a reactor was charged 25.6 grams (0.2 mole) of 2-chloroallylamine hydrochloride, 28.4 grams (0.45 mole) of concentrated ammonium hydroxide and 100 ml. of water. The solution was stirred while adding dropwise at 5–15° C. 15.2 grams (0.2 mole) of carbon disulfide and then stirred at 25–30° C. for one hour. There was then added in one portion each 28.8 grams (0.2 mole) of 2-dimethylaminoethyl chloride hydrochloride and 14.2 grams (0.225 mole) of concentrated ammonium hydroxide. An exothermic reaction set in which caused the temperature to rise from 25 to 33° C. in one-half hour. The reaction mixture was allowed to cool and stirring continued at 25–30° C. for 24 hours. The mixture was then extracted with 400 ml. of ethyl ether, washed with three 200 ml. portions of water, dried over sodium sulfate and the ether removed in vacuo at a maximum temperature of 30° C. at 1–2 mm. A 79.5% yield of 2-dimethylaminoethyl N-2-chloroallyldithiocarbamate was obtained as an amber oil. Analysis gave 11.1% nitrogen and 27.6% sulfur as compared to 11.7% nitrogen and 26.9% sulfur calculated for $C_8H_{15}ClN_2S_2$.

EXAMPLE 2

A solution was prepared from 12.8 grams (0.1 mole) of 2-chloroallylamine hydrochloride, 14.2 grams (0.225 mole) of concentrated ammonium hydroxide and 100 ml. of water. The solution so prepared was cooled to 5° C. and 7.6 grams (0.1 mole) of carbon disulfide added dropwise while keeping the temperature of the reaction mixture at 5–15° C. The reaction mixture was then stirred at 25–30° C. for one hour after which 7.6 grams (0.1 mole) of allyl chloride was added in one portion. After stirring for 24 hours at 25–30° C. the product was extracted with 400 ml. of ethyl ether. The ether solution was washed with water until neutral to litmus and dried over sodium sulfate. The ether was removed in vacuo at a maximum temperature of 30° C. The allyl N-2-chloroallyldithiocarbamate was obtained in 96.2% yield as an amber oil. Analysis gave 6.6% nitrogen, 30.5% sulfur and 17.1% chlorine as compared to 6.7% nitrogen, 30.9% sulfur and 17.1% chlorine calculated for $C_7H_{10}ClNS_2$.

Other examples prepared by the same procedure as in Example 2 but substituting the appropriate reactant are summarized in tabular form below. All were amber oils.

| Example No. | Product | | Analysis | |
|---|---|---|---|---|
| | | | Calcd., Percent | Found, Percent |
| 3 | 2-Chloroallyl N-2-chloroallyl-dithiocarbamate | S | 26.5 | 26.0 |
| | | Cl | 29.3 | 4.8 |
| 4 | cis- and trans-2,3-Dichloro-allyl N-2-chloroallyldithio-carbamate | N | 5.1 | 4.8 |
| | | S | 23.2 | 22.4 |
| | | Cl | 38.4 | 39.3 |
| 5 | 3,3-Dichloroallyl N-2-chloro-allyl-dithiocarbamate | N | 5.1 | 4.7 |
| | | S | 23.2 | 22.5 |

EXAMPLE 6

A reactor was charged with 28.0 grams (0.218 mole) of 2-chloroallylamine hydrochloride, 64.0 grams (1.0 mole) of concentrated ammonium hydroxide and 200 ml. of water. The solution was stirred and cooled to 5° C. and 16.7 grams (0.218 mole) of carbon disulfide added dropwise at 5–15° C. The reaction mixture was then stirred at 25–30° C. for one hour and 35.2 grams (0.218 mole) of 3-bromocyclohexene added in one portion. Stirring was continued for 18 hours at 25–30° C. and then the product was extracted with 400 ml. of ethyl ether. The ether solution was washed with water until neutral to litmus and dried over sodium sulfate. The ether was removed in vacuo at a maximum temperature of 80–90° C. at 1–2 mm. The 2-cyclohexenyl N-2-chloroallyl-dithiocarbamate was obtained in 57.5% yield as an amber oil. Analysis gave 6.4% nitrogen and 14.4% chlorine as compared to 5.6% nitrogen and 14.3% chlorine calculated for $C_{10}H_{14}ClNS_2$.

EXAMPLE 7

To a suitable reactor was charged 25.6 grams (0.2 mole) of 2-chloroallylamine hydrochloride, 64.0 grams (0.4 mole) of 25% sodium hydroxide and 400 ml. of water. The solution was cooled to 5° C. and 15.2 grams (0.2 mole) of carbon disulfide added dropwise with stirring at 5–15° C. The mixture was then stirred at 25–30° C. for one hour, 13.6 grams (0.1 mole) of zinc chloride dissolved in 500 ml. of water added and stirring continued for another hour. The solid product was filtered off, washed with water until neutral to litmus and air dried at 25–30° C. The zinc 2-chloroallyldithiocarbamate, hydrate, obtained in 69.7% yield, was a tan solid, M.P. 95–100° C. with decomposition. Analysis gave 6.3% nitrogen and 16.2% chlorine as compared to 6.7% nitrogen and 17.0% chlorine calculated for $C_8H_{10}Cl_2N_2S_4Zn\cdot H_2O$.

Other examples prepared by the same procedure as in Example 7 but substituting a water solution of the desired metal compound are summarized in tabular form below. All were yellow solids.

| Example No. | Product | Percent Yield | M.P., °C. | Analysis | | |
|---|---|---|---|---|---|---|
| | | | | | Calcd., Percent | Found, Percent |
| 8 | Copper 2-chloroallyl-dithiocarbamate | 63.0 | [1] 150-162 | S | 32.31 | 32.01 |
| 9 | Nickel 2-chloroallyl-dithiocarbamate, hydrate | 78.0 | 300 | N | 6.82 | 6.09 |
| | | | | S | 31.24 | 30.93 |

[1] With decomposition.

The new compounds are useful for destroying fungi, a property which they retain in the presence of soil, whereas many otherwise effective fungicides lose their activity in the presence of soil. This property was demonstrated by infesting soil with "damping off" fungi, treating the infested soil with the test material, incubating for 24 hours and sowing seeds in the incubated soil and assessing disease incidence after 10–14 days. A stock solution of the test material was pipetted into a glass jar containing one pound of infested soil. A concentration of 100 parts per million of chemical in the soil corresponds to a dosage of 200 pounds per acre. Application within the range of 30 to 500 pounds per acre encompasses the rate of application suitable for practical control of pathogenic organisms in most cases. The "damping-off" fungi present were principally Pythum, Rhizoctonia and Fusarium species. The jar was sealed and the contents thoroughly mixed by vigorous shaking. The treated soil was incubated at room temperature for 24 hours, transferred to clay pots and 5 seeds of each of 4 crop plants shown in each pot. The crop plants were Black Valentine beans, Delta Pine No. 15 cotton, Straight Eight cucumber and Laxton's Progress peas. The seeded pots were then incubated at 70° F. at 98% humidity to insure activity of the organisms in the soil. 24 hours later the pots were removed to a greenhouse and disease assessments made within 10–14 days. The percent emergence and disease incidence was recorded. The ratings were based on inoculated, untreated and uninoculated, sterile soil treatments. For convenience in recording the data, the following rating scale was used.

Rating: Healthy plants out of 20
E ------------------------------------- 18–20
P ------------------------------------- 15–17
F ------------------------------------- 12–14
N—not effective—11 or less The results are recorded below:

Table I

| Toxicant | Soil fungicide rating (pounds per acre) | |
|---|---|---|
| | 200 | 60 |
| 2-Dimethylaminoethyl N-2-chloroallyldithiocarbamate | P | F |
| Allyl N-2-chloroallyldithiocarbamate | P | F |
| 2-Chloroallyl N-2-chloroallyldithiocarbamate | F | P |
| 3,3-Dichloroallyl N-2-chloroallyldithiocarbamate | F | N |

The new compounds are also useful as insecticides. 100% kill of yellow mosquito larvae was achieved with 0.001% concentrations of cis- and trans-2,3-dichloroallyl N-2-chloroallyldithiocarbamate, 3,3-dichloroallyl N-2-chloroallyldithiocarbamate, 2-chloroallyl N-2-chloroallyldithiocarbamate and allyl N-2-chloroallyldithiocarbamate.

The compounds are desirably formulated with inert adjuvants as carrier, the carrier comprising the major proportion of the composition. The addition of surface active agents aids the preparation of dispersions. Solid as well as liquid carriers are useful wherein the active ingredient is distributed over a dry, free-flowing powder, as for example clays (bentonite, attapulgite), talc, diatomaceous earth, fuller's earth, chalk or calcium carbonate. The required concentration of the active ingredient is small, usually not more than 10% and may be as low as 0.001%.

It is intended to cover all changes and modifications of the examples of the invention herein chosen for purposes of disclosure which do not constitute departures from the spirit and scope of the invention.

What is claimed is:

1. A compound possessing the structure

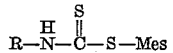

where R represents a halogen substituted lower 2-alkenyl group in which said halogen is attached to unsaturated carbon and Mes is selected from a group consisting of zinc, copper and nickel.

2. A compound possessing the structure

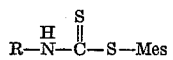

where R represents a halogen substituted lower 2-alkenyl group in which said halogen is attached to unsaturated carbon and Mes is selected from a group consisting of di(lower alkyl)aminoethyl, lower 2-alkenyl, cyclohexenyl and halogen substituted lower 2-alkenyl in which said halogen is attached to unsaturated carbon.

3. A compound possessing the structure

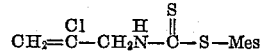

where Mes represents zinc.

4. A compound possessing the structure

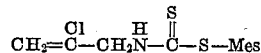

where Mes represents lower 2-alkenyl.

5. A compound possessing the structure

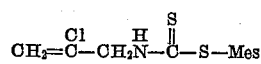

where Mes represents di(lower alkyl)aminoethyl.

6. 2-chloroallyl 2-chloroallyldithiocarbamate.
7. Allyl 2-chloroallyldithiocarbamate.

References Cited in the file of this patent
UNITED STATES PATENTS

| 2,060,733 | Hunt et al. | Nov. 10, 1936 |
| 2,173,732 | Sebrell et al. | Sept. 19, 1939 |
| 2,854,467 | Harman et al. | Sept. 30, 1958 |
| 2,882,291 | Harman et al. | Apr. 14, 1959 |
| 2,895,980 | Harman et al. | July 21, 1959 |
| 2,916,370 | Tilles et al. | Dec. 8, 1959 |

UNITED STATES PATENT OFFICE
CERTIFICATE OF CORRECTION

Patent No. 3,051,735                          August 28, 1962

John J. D'Amico

It is hereby certified that error appears in the above numbered patent requiring correction and that the said Letters Patent should read as corrected below.

Column 2, in the table, fifth column, line 2 thereof, for "4.8" read -- 29.4 --.

Signed and sealed this 18th day of December 1962.

(SEAL)
Attest:

ERNEST W. SWIDER                            DAVID L. LADD
Attesting Officer                              Commissioner of Patents